May 29, 1956     K. L. BERNINGER ET AL     2,747,676
PROPELLER MECHANISM
Filed April 23, 1952
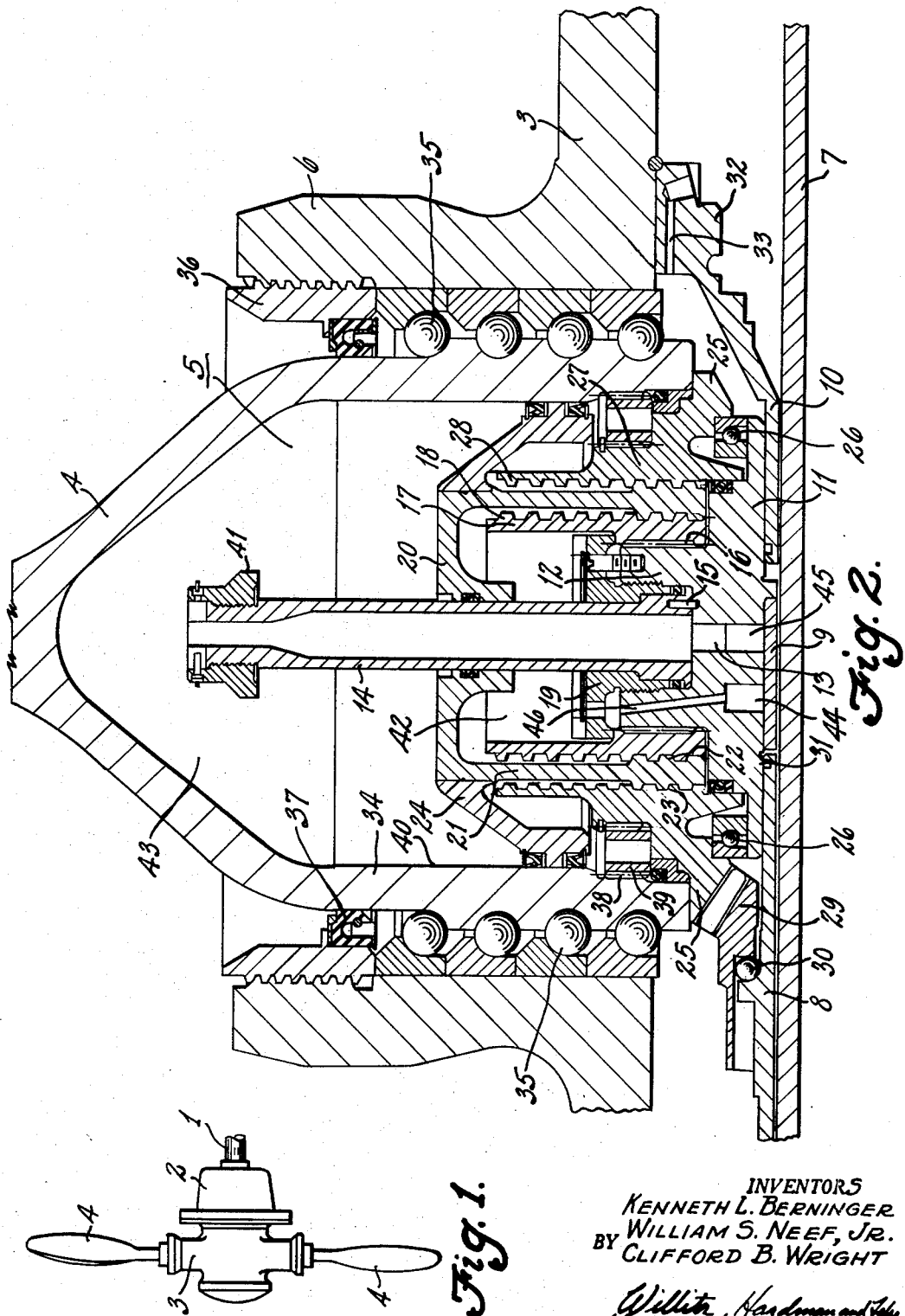
INVENTORS
KENNETH L. BERNINGER
BY WILLIAM S. NEEF, JR.
CLIFFORD B. WRIGHT
their ATTORNEYS Patented May 29, 1956

2,747,676
PROPELLER MECHANISM

Kenneth L. Berninger and William S. Neef, Jr., Dayton, and Clifford B. Wright, Tipp City, Ohio, assignors to General Motors Corporation, Detroit, Mich., a corporation of Delaware Application April 23, 1952, Serial No. 283,956

8 Claims. (Cl. 170—160.33)

The present invention relates to variable pitch propellers and more particularly to a torque unit for adjusting the pitch position of a propeller blade.

One of our objects is to provide a torque unit of the type disposed within the hollow root portion of a propeller blade having means utilizing the hollow root portion as the pressure cylinder. The aforementioned and other objects are accomplished in the present invention by mounting a floating island supporting structure within a propeller hub. The island is provided with a plurality of radial extensions coaxially disposed within the hub sockets. Secured to each island extension is a fixed, splined member and a transfer tube. A centrally apertured piston, adapted for reciprocal movement, is mounted on the transfer tube, the piston having a radially inward extending skirt splinedly engaging the fixed spline member. A blade gear having a radially outward extending portion coaxially disposed within the hub socket, is journaled for rotation upon a fixed propeller shaft. The blade gear extending portion is provided with splines that also engage splines on the piston skirt. The hollow root portion of a blade is supported by stack bearings within the hub socket, the blade gear and blade root being operatively interconnected. By this construction the hollow root portion forms a torque unit cylinder, thereby enabling a larger diameter of piston for the torque unit. By reason of the piston having a larger area, fluid medium under lower pressure can be utilized to effect movements thereof.

Further objects and advantages of the present invention will be apparent from the following description, reference being had to the accompanying drawing wherein a preferred embodiment of the present invention is clearly shown.

In the drawing:

Fig. 1 is a perspective view of a variable pitch propeller.

Fig. 2 is a cross sectional view of a blade adjusting torque unit constructed according to the present invention.

Referring more particularly to the drawing, 1 represents a shaft for rotating the propeller, 2 represents a regulator rotatable with the propeller which comprises a hub 3 having journaled therein blades 4. Propeller is generally of the type disclosed in the Blanchard et al. Patents 2,307,101 and 2,307,102, wherein the fluid pressure system for actuating the blade adjusting torque unit rotates with the propeller and is contained within the regulator 2.

Referring to Fig. 2, a torque unit designated generally by 5, for adjusting the pitch position of the propeller blade 4 is shown in cross section. The torque unit 5 is mounted within a hub socket 6 of the propeller hub 3, the propeller hub 3 being mechanically connected to the propeller shaft 1 so as to rotate therewith, by any suitable means, not shown. The propeller hub 3 is supported by bearings, not shown, upon a fixed hollow shaft 7. The shaft 7 is fixed relative to the rotatable hub 3, the arrangement being such that the hub 3 carrying the propeller blades 4 rotates about the shaft 7. The sleeves 8 and 9 are operatively connected to the propeller hub 3 by any suitable means, not shown, and the sleeve 9 is operatively connected to the island 11, so that all propeller structure above the fixed shaft in Fig. 2 is rotatable relative thereto. Encompassing portions of the fixed hollow shaft 7 are a plurality of sleeves 8, 9 and 10. Supported on sleeves 8 and 9 is a floating island structure 11 having a plurality of radial extensions or bosses, only one, 12, of which is shown, coaxially disposed within the hub sockets. The island 11 is provided with a central bore 13 which communicates with the bore of a transfer tube 14 which is anchored to the island by means of a dowel pin 15. The outer circumferential surface of the extension 12 is provided with a series of straight spline teeth 16 which engage straight spline teeth on a tubular member 17, restrained from rotation by its connection with island extension 12, is further provided with a plurality of helical spline teeth 18 on its outer circumferential surface. Both the transfer tube 14 and the splined member 17 are retained in position by means of a lock nut 19 which has threaded engagement with the island extension 12, by reason of shoulders on the nut 19 engaging flanges on the members 14 and 17. Mounted for reciprocal movement on the transfer tube 14 is a centrally apertured piston 20 having an integral inwardly extending skirt 21 disposed coaxially of the fixed spline member 17. The lower portion of the skirt 21 is provided with a series of helical spline teeth 22 and 23 on its inner and outer circumferential surfaces, respectively. The series of helical spline teeth 22 engage the helical spline teeth 18 on the member 17. Attached to the piston 20 is a frusto conical rim portion 24, the function of which will be later described.

A blade gear 25, journaled for rotation by bearing means 26 upon the floating island 11, is provided with an integral outwardly extending portion 27 coaxially disposed within the hub socket 6. The extending portion 27 is provided with a series of helical spline teeth 28 on its inner circumferential surface, which teeth engage teeth 23 of the skirt 21. The blade gear 25 has toothed engagement with a master blade gear 29 which coordinates movements of all propeller blades mounted on the hub 3. The master blade gear 29 is supported by bearing means 30 upon the sleeve 8, the sleeve 8 being piloted to the floating island 11 at 31. The sleeve 10 is provided with an extension 32 in engagement with the hub 3, the extension 32 being provided with a lubricating passage 33 for the several bearings within the hub socket 6.

The hollow root portion 34 of the blade is provided with integral bearing races for supporting a series of ball bearings 35 which comprise the stack bearing journaling the blade 4 within the hub socket 6. The outer races of the ball bearings 35 are retained within the hub socket 6 by means of a retaining nut 36 having threaded engagement with the hub socket. Suitable sealing means 37 are provided for preventing the loss of lubricating oil for the bearings 35. The inner portion of the blade root 34 is provided with a series of straight spline teeth 38 in engagement with straight splines on an indexing ring 39 which also splinedly engages the extending portion 27 of the blade gear 25. The frusto conical rim portion 24 secured to the piston 20 has fluid tight engagement with the inner circumferential surface 40 of the blade root portion 34. As is apparent from inspection of the drawing, the root portion 34 forms the side walls and the end wall of a cylinder for the torque unit 5. In this manner a piston having an area equal to the area of the hollow root portion can be utilized thus permitting fluid medium under lower pressure to be used for actuating the torque unit 5. The free end of the transfer tube 14 is provided with a nut 41 which serves as a mechanical stop limiting outward movement of the piston 20. Inward movement of the piston 20 is limited by engagement of the skirt 21 with the island 11.

Movement of the piston 20 is effected by hydraulic fluid under pressure in a manner similar to that disclosed in the Blanchard et al. patents previously referred to. Passages are provided in the hub 3, not shown, for directing the flow of fluid under pressure to opposite sides of the piston 20 dividing the cylinder formed by the blade root into an increase pitch chamber 42 and a decrease pitch chamber 43. One of the fluid passages in the hub terminates in a chamber or pocket 44 within the floating island 11. The pocket 44 is connected by a passage 46 with the increase pitch chamber 42, the pocket being closed at one end by the sleeve 9. Another fluid passage in the hub terminates in the chamber or pocket 45 in the island 11, one end of the pocket 45 is also closed by the sleeve 9 and the other end of the pocket connects by means of passage 13 with the hollow transfer tube 14 and the decrease pitch chamber 43. The flow of fluid to and from the torque unit chambers is under the control of a fluid pressure system contained within the regulator 2.

Outward movement of the piston 20 effected by the application of fluid pressure to chamber 42, effects rotary movement of the extension 27 and the blade 4 toward an increase pitch position in the following manner: as the piston 20 and its associated skirt 21 move outwardly with respect to the member 17, splined teeth 18 and 22 cause a twisting or rotation to occur in the piston and skirt relative to the fixed member 17. This outward movement of the skirt 21 also effects a relative movement between spline teeth 23 and 28. Accordingly, the extension 27 is caused to rotate with a movement which is the sum of that caused by the leads of spline teeth 18, 22, 23 and 28. This rotary movement of the member 27 is transmitted by an indexing ring 39 to a propeller blade 4. Movements of the piston 20 downward, as viewed in the drawing, under the urge of fluid pressure chamber 43 and the coincident drainage from chamber 42, will effect movement of the blade toward a lesser pitch position in a similar manner.

By reason of the total area of the blade root portion being utilized as the torque unit cylinder, a substantially larger piston area is afforded. The larger piston area makes possible and practicable the use of lower pressures than before possible. The use of a lower pressure is extremely beneficial by reason of the various seals and fluid tight connections being exposed thereto. A torque unit constructed according to the present invention will indubitably result in fewer mishaps.

While the embodiment of the present invention as herein disclosed, constitutes a preferred form, it is to be understood that other forms might be adopted.

What is claimed is as follows:

1. In a variable pitch propeller having blades movable within a range of pitch positions, the combination including, a propeller hub having a plurality of radially extending sockets, a fixed shaft extending through said hub and about which said hub is supported for rotation, a pair of axially spaced sleeves attached to said hub and encompassing said fixed shaft, a floating island supported on said sleeves and having a plurality of radial extensions disposed coaxially within the hub sockets, means journaling said propeller blades for rotation within said hub sockets, a torque unit mounted in each of the hub sockets, said torque units comprising a cylinder having its side walls and one end wall formed by the hollow root portion of each blade and a piston within said cylinder and mounted for reciprocal movement therein under the urge of fluid pressure, and means interconnecting said pistons and said blades to provide for adjustment of blade pitch upon movement of said pistons.

2. The combination set forth in claim 1 wherein the means journaling said propeller blades for rotation includes a stack bearing, the inner race of which is integral with said blades.

3. In a variable pitch propeller having blades movable within a range of pitch positions, the combination including, a propeller hub having a plurality of radially extending sockets, a fixed shaft extending through said hub and about which said hub is supported for rotation, a pair of axially spaced sleeves attached to said hub and encompassing said fixed shaft, a floating island supported on said sleeves and having a plurality of radial extensions disposed coaxially within the hub sockets, means journaling said propeller blades for rotation within said hub sockets, a torque unit mounted in each of the hub sockets, said torque units comprising a cylinder having its side walls and one end wall formed by the hollow root portion of each blade and a piston within said cylinder and mounted for reciprocal movement therein under the urge of fluid pressure, and means interconnecting said pistons and said blades to provide for adjustment of blade pitch upon movement of said pistons, said means including a plurality of members provided with a series of helical spline teeth and an indexing ring provided with internal and external straight splines.

4. In a variable pitch propeller, the combination including, a hub having a radially extending socket, a blade having a hollow root portion mounted within said socket for rotation about its longitudinal axis to vary the pitch position thereof, the hollow root portion of said blade constituting the sidewalls and one end wall of a cylinder, a reciprocable piston disposed in said cylinder capable of fluid pressure actuation in either direction, an element floatingly supported within said hub and having a radial boss extending into said cylinder, said blade being rotatable about its longitudinal axis relative to said element, a sleeve attached to said boss and having exterior helical splines, a member rotatably supported by said element and having a radially extending annular portion coaxially disposed in said cylinder and radially spaced from said sleeve, said annular portion having interior helical splines, said piston having an axially extending skirt, the interior and exterior surfaces of which having helical splines thereon, the interior helical splines of said skirt having engagement with the helical splines on said sleeves and the exterior helical splines of said skirt having engagement with the helical splines of said annular portion, the construction and arrangement being such that reciprocable movement of said piston effects rotation of said member, and means interconnecting said member and said blade to provide for adjustment of blade pitch upon reciprocable movement of said piston.

5. In a variable pitch propeller, the combination including, a hub having a radially extending socket, a blade having a hollow root portion mounted within said socket for rotation about its longitudinal axis to vary the pitch position thereof, the hollow root portion of said blade constituting the sidewalls and one end wall of a cylinder, a reciprocable piston disposed in said cylinder capable of fluid pressure actuation in either direction, an element floatingly supported within said hub and having a radial boss extending into said cylinder, said blade being rotatable about its longitudinal axis relative to said element, a sleeve attached to said boss and having exterior helical splines, a member rotatably supported by said element and having a radially extending annular portion coaxially disposed in said cylinder and radially spaced from said sleeve, said annular portion having interior helical splines, said piston having an axially extending skirt, the interior and exterior surfaces of which having helical splines thereon, the interior helical splines of said skirt having engagement with the helical splines on said sleeves and the exterior helical splines of said skirt having engagement with the helical splines of said annular portion, the construction and arrangement being such that reciprocable movement of said piston effects rotation of said member, means operatively connected to said boss and engageable with said piston for limiting movement thereof in one direction, and means interconnecting said member and said blade to provide for adjustment of blade pitch upon reciprocable movement of said piston.

6. The combination set forth in claim 5 wherein said piston divides said cylinder into an inner chamber and an outer chamber, passage means in said element having connection with the inner chamber, a tubular member attached to said element and extending through said piston for communication with the outer chamber, said tubular member having connection with passage means in said element, and wherein the means for limiting piston movement in one direction comprise an abutment attached to the end of said tubular member within the outer chamber and engageable with the piston.

7. In a variable pitch propeller, the combination including a fixed shaft, a hub supported for rotation about said shaft and having a plurality of radially extending sockets, a plurality of propeller blades, equal in number to the number of said sockets and having hollow root portions, means journaling the root portions of said propeller blades within said sockets for rotation about their longitudinal axes to vary the pitch position thereof, the hollow root portion of each propeller blade constituting the sidewalls and one end wall of a cylinder, a reciprocable piston disposed in each cylinder and capable of fluid pressure actuation in either direction, an element floatingly supported in said hub and having a plurality of radial bosses extending coaxially into said cylinders, said blades being rotatable about their longitudinal axes relative to said element, a blade gear for each propeller blade rotatably supported by said element, means interconnecting the blade gears of all propeller blades to coordinate their movements, means interconnecting the piston of each cylinder with its respective blade gear such that rotation is imparted to said blade gears upon reciprocable movement of said pistons, and means connecting each blade gear to its respective blade to provide for adjustment of blade pitch upon reciprocable movement of said pistons.

8. In a variable pitch propeller, the combination including, a hub having a radial extending socket, a blade having a hollow root portion mounted within said socket for rotation about its longitudinal axis to vary the pitch position thereof, the hollow root portion of said blade constituting the side walls and one end wall of a cylinder, a reciprocable piston disposed in said cylinder capable of fluid pressure actuation in either direction, said piston dividing said cylinder into an inner chamber and an outer chamber, a member operatively connected with said hub and extending through said piston into the outer chamber, abutment means attached to said member within the outer chamber and engageable with said piston for limiting movement thereof in one direction, and means interconnecting said piston and said blade for rotating said blade to adjust the pitch position thereof in response to piston reciprocation.

References Cited in the file of this patent

UNITED STATES PATENTS

| 1,027,252 | Isaacson | May 21, 1912 |
| 1,411,126 | Page | Mar. 28, 1922 |
| 1,481,024 | Porter | Jan. 15, 1924 |
| 2,307,101 | Blanchard et al. | Jan. 5, 1943 |
| 2,307,102 | Blanchard et al. | Jan. 5, 1943 |
| 2,460,910 | Sheets et al. | Feb. 8, 1949 |
| 2,500,692 | Martin et al. | Mar. 14, 1950 |
| 2,528,281 | Martin et al. | Oct. 31, 1950 |

FOREIGN PATENTS

| 539,303 | Great Britain | Sept. 4, 1941 |